(12) United States Patent
Matsui et al.

(10) Patent No.: US 8,195,065 B2
(45) Date of Patent: Jun. 5, 2012

(54) IMAGE-FORMING APPARATUS HAVING PROTRUSION PART FOR INHIBITING FLOW OF TONER TOWARD LIGHT-PASSING PART

(75) Inventors: Toshiyuki Matsui, Ebina (JP); Hiroki Ando, Ebina (JP); Satoshi Honobe, Ebina (JP); Tsuneo Fukuzawa, Ebina (JP); Tomonori Sato, Ebina (JP); Fumiaki Maekawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 102 days.

(21) Appl. No.: 12/784,866

(22) Filed: May 21, 2010

(65) Prior Publication Data
US 2011/0123222 A1    May 26, 2011

(30) Foreign Application Priority Data
Nov. 20, 2009   (JP) .................................. 2009-265565

(51) Int. Cl.
*G03G 15/01* (2006.01)
*G03G 21/18* (2006.01)
(52) U.S. Cl. ........................... 399/111; 399/98; 399/107
(58) Field of Classification Search .................. 399/111, 399/110, 107, 112, 98
See application file for complete search history.

(56) References Cited

U.S. PATENT DOCUMENTS

| | | | |
|---|---|---|---|
| 7,106,991 B2 * | 9/2006 | Hosokawa et al. | 399/111 |
| 7,136,610 B2 * | 11/2006 | Arai et al. | 399/111 |
| 7,409,174 B2 * | 8/2008 | Tsurusaki | 399/98 |
| 2007/0166074 A1 * | 7/2007 | Hosokawa et al. | 399/111 |
| 2009/0245850 A1 * | 10/2009 | Kawai et al. | 399/98 |

FOREIGN PATENT DOCUMENTS
JP   2004-212986 A   7/2004
* cited by examiner

*Primary Examiner* — Sophia S Chen
(74) *Attorney, Agent, or Firm* — Sughrue Mion, PLLC (57) ABSTRACT

An image-forming apparatus includes: an exposing unit that irradiates exposing light to an image carrier; a partition member that includes: a light-passing part that allows exposing light irradiated by the exposing unit to pass through the partition member, and that extends in a direction in which the developing unit is attached to or detached from the image-forming apparatus; and a protrusion part that extends along the light-passing part, wherein the light-passing part, the protrusion part, and a part of the partition member located below a supply opening of the developing unit attached to the image-forming apparatus are arranged in an order of the light-passing part, the protrusion part, and the part of the partition member located below the supply opening.

8 Claims, 4 Drawing Sheets

FIG. 4A
WHEN IMAGE-FORMING UNIT 13 IS NOT ATTACHED

FIG. 4B
WHEN IMAGE-FORMING UNIT 13 IS ATTACHED

FIG. 7

IMAGE-FORMING APPARATUS HAVING PROTRUSION PART FOR INHIBITING FLOW OF TONER TOWARD LIGHT-PASSING PART

CROSS-REFERENCE TO RELATED APPLICATIONS

This application is based on and claims priority under 35 USC 119 from Japanese Patent Application No. 2009-265565 filed on Nov. 20, 2009.

BACKGROUND

1. Technical Field

The present invention relates to an image-forming apparatus.

2. Related Art

In an image-forming apparatus such as a printer or a copier, components relating to image formation are unitized (as an "image-forming unit") so that a user or maintenance engineer is able to easily attach or detach the components.

SUMMARY

An aspect of the prevent invention provides an image-forming apparatus including: a first exposing unit provided below a first image carrier, that irradiates exposing light to the first image carrier; a partition member that separates a space in which the first exposing unit is provided from a space in which the first image carrier is provided, the partition member including: a first light-passing part that allows exposing light irradiated by the first exposing unit to pass through the partition member, and that extends in a direction in which a first developing unit is attached to or detached from the image-forming apparatus, the first developing unit being a unit that develops a latent image carried by the first image carrier, using color materials supplied through a first supply opening of the first developing unit; and a first protrusion part that extends along the first light-passing part, wherein the first light-passing part, the first protrusion part, and a part of the partition member located below the first supply opening of the first developing unit attached to the image-forming apparatus are arranged in an order of the first light-passing part, the first protrusion part, and the part of the partition member located below the first supply opening; and an image-transferring unit that transfers an image developed by the first developing unit to a medium.

BRIEF DESCRIPTION OF THE DRAWINGS

Exemplary embodiments of the present invention will be described in detail below with reference to the following figures, wherein.

DETAILED DESCRIPTION

An exemplary embodiment of the present invention will be described below with reference to the drawings.

Figure 1:
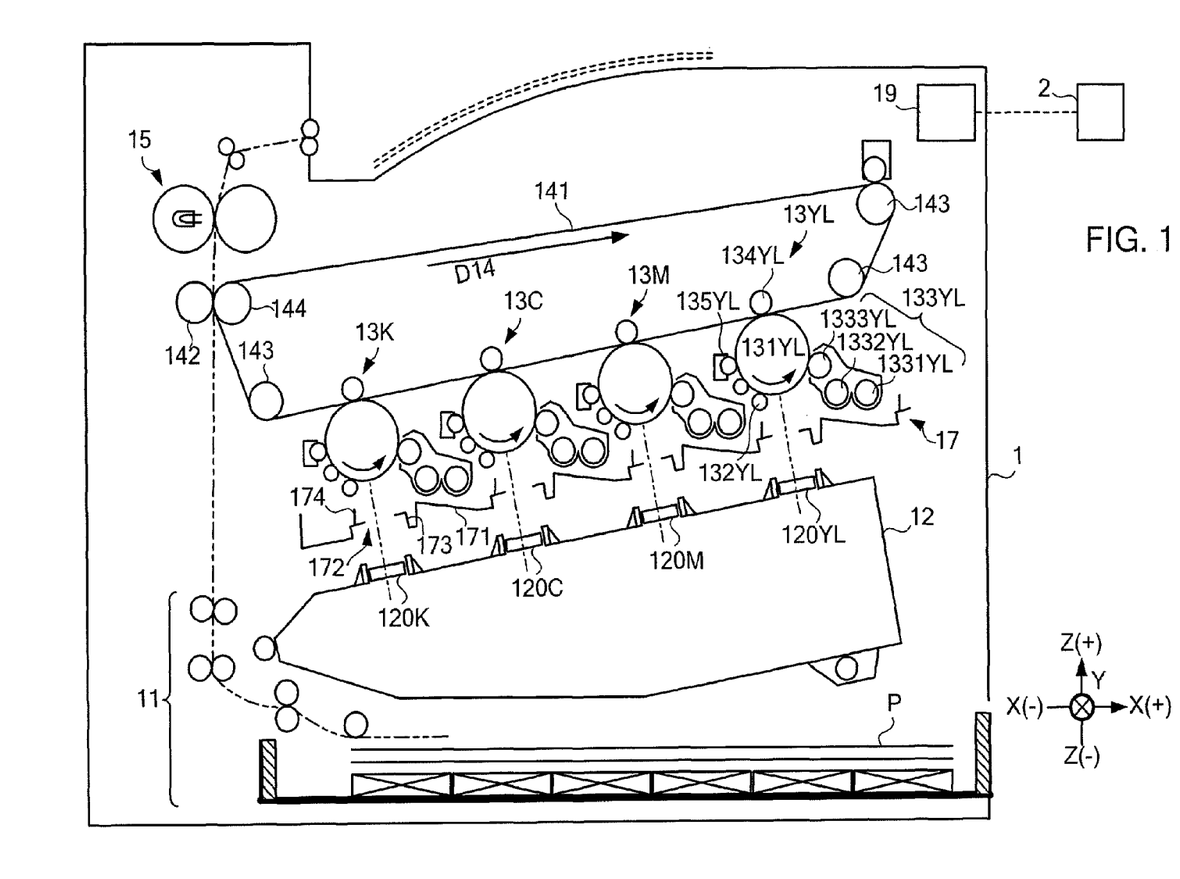
FIG. 1 is a diagram showing a configuration of an image-forming apparatus.

FIG. 1 is a diagram showing a configuration of an image-forming apparatus according to the present exemplary embodiment.

The following description will be made with reference to an X-Y-Z orthogonal coordinate system that is defined as follows. The right side and the left side as viewed from the front of image-forming apparatus 1 are referred to as X(+) side and X(−) side, respectively. The far side and the near side in the depth direction are referred to as Y(+) side and Y(−) side, respectively. The upper side and the lower side in the height direction are referred to as Z(+) side and Z(−) side, respectively.

Image-forming apparatus 1 is an example of an image-forming apparatus according to the present invention. Image-forming apparatus 1 forms an image using an electro-photographic process. Image-forming apparatus 1 is also configured so that image-forming units 13YL, 13M, 13C, and 13K, which correspond to yellow (YL), magenta (M), cyan (C), and black (K), respectively, are attached and detached. Image-forming units 13YL, 13M, 13C, and 13K function as toner-image-forming units that form a toner image. When image-forming units 13YL, 13M, 13C, and 13K are attached to image-forming apparatus 1, each unit is supported by partition member 17 at the bottom (Z(−) side) of each unit, and fixed in the apparatus. Image-forming apparatus 1 has opening and closing cover 203 (described later) that is provided in the front of a case of the image-forming apparatus. Image-forming units 13YL, 13M, 13C, and 13K are attached or detached after opening and closing cover 203 is opened.

Partition member 17 is an example of a partition member according to the present invention. The partition member separates a space in which exposing device 12 is provided from a space in which image-forming units 13YL, 13M, 13C, and 13K are provided. Specifically, the partition member separates a space in which exposing device 12 is provided from a space in which image-forming units 13YL, 13M, 13C, and 13K are provided, so that the two spaces are adjacent to each other in the vertical direction (Z direction) via partition member 17. Partition member 17 is provided in a case of image-forming apparatus 1 so that the member is tilted relative to X direction at a certain angle (e.g., 10 degrees). Accordingly, an end of partition member 17 (at X(+) side) in X direction is located higher than the other end (at X(−) side) of the partition member. Specifically, image-forming unit 13YL that handles yellow (YYL) toners, located at X(+) side, is located relatively high, and image-forming unit 13K that handles black (K) toners, located at X(−)side, is located relatively low. According to the configuration, a size of image-forming apparatus 1 in the horizontal direction is smaller than that of an image-forming apparatus in which image-forming units 13YL, 13M, 13C, and 13K are horizontally arranged. It is to be noted that in the following description, a "downward direction" refers to a vector having a component of a vertically downward direction (direction of gravitational force), and an "upward direction" refers to a vector having a component of a vertically upward direction (direction opposite to the direction of gravitational force). Also, it is to be noted that in the following description, a surface facing the upward direction will be referred to as "upper surface," and a surface facing the downward direction will be referred to as "downward surface." Details of the configuration of partition member 17 will be described later.

Now, a configuration of image-forming unit 13 and components around the unit relating to image formation will be described. It is to be noted that in FIGS. 1 and 2, only components relating to image-forming unit 13YL, among image-forming units 13YL, 13M, 13C, and 13K, are labeled, to avoid making the figures complicated. Also, it is to be noted that a letter attached at the end of a label showing a component relating to image-forming units 13YL, 13M, 13C, and 13K denotes a color of toner used in image-forming apparatus 1. Components having an identical label other than a letter attached at the end of the label handle different colors of toners, but have an identical configuration. In the following description, except where it is necessary to specify a particular component, description of a letter attached at the end of a sign will be omitted.

Photoreceptor drum 131 is an example of an image carrier according to the exemplary embodiment of the present invention. Photoreceptor drum 131 is a cylindrical member on which a photoconductive layer is formed. Photoreceptor drum 131 carries an electrostatic latent image that is formed in response to exposing light irradiated to the surface of the photoreceptor drum. Photoreceptor drum 131 is caused to rotate by movement of intermediate transfer belt 141 while the photoreceptor drum is in contact with the intermediate transfer belt. Specifically, the photoreceptor drum is caused to rotate in a direction of the arrow shown in FIG. 1 around the center of the cylinder (an axis perpendicular to the plane of paper of FIG. 1). Charging device 132 is an example of a charging unit according to the present invention. The charging device charges a photoconductive layer of photoreceptor drum 131 to a predetermined potential. Exposing device 12 is an example of an exposing unit according to the present invention. The exposing device includes four semiconductor lasers (none of which is shown) that irradiate exposing light modulated on the basis of image data. Exposing device 12 also includes exposure lenses 120. The exposing device is provided below photoreceptor drums 131 of image-forming units 13, and irradiates exposing light to the photoreceptor drums via exposure lens 120 and light-passing part 172 (described later). Exposing device 12 is provided below four image-forming units 13, and irradiates exposing light from Z(−) side to Z(+) side.

Developing device 133 is an example of a developing unit according to the exemplary embodiment of the present invention. The developing device stores developers including toners of any one of colors of YL, M, C, and K as color materials. The developing device provides toner to a latent image formed on photoreceptor drum 131 so that the latent image is developed. At an opening section of a case of developing device 133, developing roll 1333 is provided so that it faces photoreceptor drum 131. At the back of developing roll 1333 in the case, supply auger 1332 is provided. The supply auger agitates developers and provides them to developing roll 1333. If supply auger 1332 is caused to rotate, developers are provided to developing roll 1333 and absorbed onto a surface of the developing roll, and conveyed to a developing area that faces photoreceptor drum 131. At the back of supply auger 1332 in the case, agitation roll 1331 is provided. Also, at a position above agitation roll 1331 in the case of developing device 133, shutter 1334 and supply opening 1335 are provided (see FIG. 2). Detailed of the shutter and the supply opening will be described later.

Cleaning device 135 is an example of a cleaning unit according to the exemplary embodiment of the present invention. A part of the cleaning device is brought into contact with a surface of photoreceptor drum 131 from which a developed image has been transferred. Cleaning device 135 cleans a contact area of photoreceptor drum 131 by scraping toners that remains in the contact area after a transfer process is finished. Cleaning device 135 discharges toners that have been collected by cleaning a contact area of photoreceptor drum 131, out of cleaning device 135 (namely, out of image-forming unit 13) via a discharge opening of toner discharging unit 1351 (shown in FIG. 2).

The foregoing is a description of a configuration of image-forming unit 13.

Intermediate transfer belt 141 is an endless belt-like member, which is caused to rotate in a direction of arrow D14 shown in FIG. 1, while contacting rotating rolls 143, first transfer rolls 134 and backup roll 144. Rotating rolls 143 are cylindrical members that support movement of intermediate transfer belt 141, which are caused to rotate around the center of the cylinder. First transfer rolls 134 are cylindrical members that face photoreceptor drum 131 across intermediate transfer roll 134. First transfer rolls 134 cause a difference in potential between the roll and photoreceptor drum 131 to transfer toners provided on a surface of photoreceptor drum 131 to a surface of intermediate transfer belt 141. Second transfer roll 142 is a cylindrical member that faces backup roll 144 across intermediate transfer belt 141. Second transfer roll 142 causes a difference in potential between the roll and backup roll 144 so that toners provided on a surface of intermediate transfer belt 141 are transferred onto a surface of a sheet. Fixing device 15 carries out a fixing operation to apply heat and pressure to a sheet onto which a toner image has been transferred, so that the toner image is fixed on the sheet.

Controller 19 controls components of image-forming apparatus 1. For example, controller 19 carries out control for forming an image on recording sheet P on the basis of image data obtained from external device 2. If components of image-forming apparatus 1 are caused to function as an image-forming unit according to the present invention, by controller 19, an image developed by image-forming unit 13 is transferred from photoreceptor drum 131 to recording sheet P and fixed thereon. In the process, under control of controller 19, recording sheet P is taken out from storage unit 11, which is provided inside image-forming apparatus 1, and conveyed, and at a nip section formed by second transfer roll 142 and backup roll 144, a toner image is transferred to recording sheet P from intermediate transfer belt 141. Thereafter, recording sheet P is discharged out of image-forming apparatus 1 under control of controller 19. It is to be noted that recording sheet P may be a piece of paper, a plastic sheet, or a sheet of other material, as long as the sheet is a medium on which an image can be formed.

Now, a configuration of partition member 17 will be described in detail.

Figure 2:
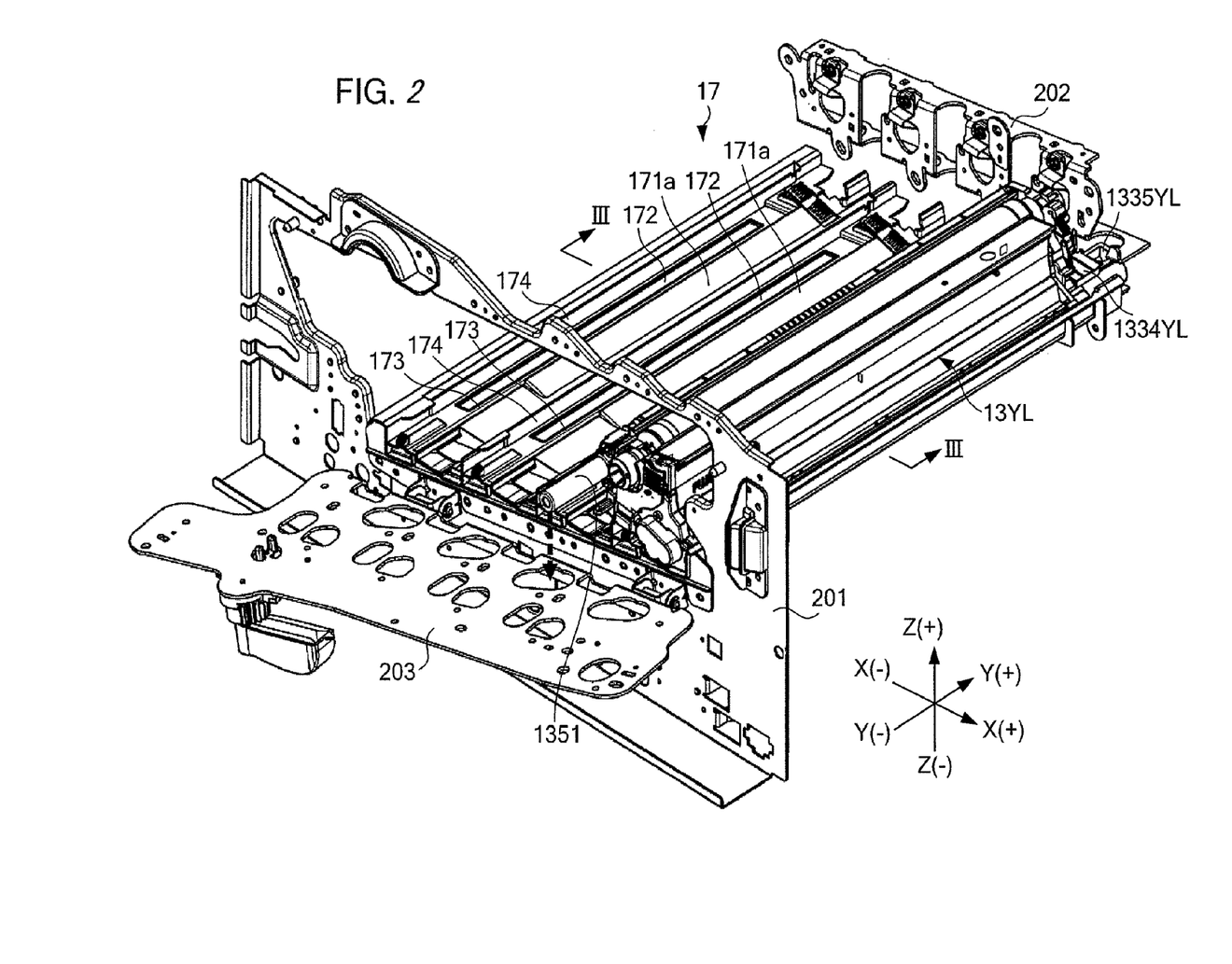
FIG. 2 is an oblique perspective view of an appearance of a partition member.

FIG. 2 is an oblique perspective view of an appearance of partition member 17 in a case where image-forming unit 13YL is attached.

Image-forming unit 13 has an elongate shape that extends in Y direction in image-forming apparatus 1. Image-forming unit 13 is moved in Y direction when the unit is attached to or detached from image-forming apparatus 1. When a user attaches image-forming unit 13 to image-forming apparatus 1, the unit is moved in Y direction from Y(−) side to Y(+) side along the upper surface of partition member 17. In contrast, when a user detaches image-forming unit 13 from image-forming apparatus 1, the unit is moved in Y direction from Y(+) side to Y(−) side along the upper surface of partition member 17. On the front side of case 201 of image-forming apparatus 1, opening and closing cover 203 is provided so that it can be opened or closed. As shown in FIG. 2, attaching and detaching of image-forming unit 13 is performed by a user when opening and closing cover 203 is open. When image-forming unit 13 is attached to image-forming apparatus 1, the back side (Y(+) side) of the image-forming unit is supported by support plate 202 provided on the back side of case 201 of image-forming apparatus 1.

On the upper surface of image-forming unit 13, at the back side (Y(+) side), attached to image-forming apparatus 1, supply opening 1335 is provided. The supply opening is an opening through which toners are supplied from a toner cartridge (not shown) to developing device 133. Developing device 133 develops an image using toners supplied through supply opening 1335. On the upper surface of image-forming unit 13, shutter 1334 is provided. The shutter is a closing and opening member that closes or opens supply opening 1335. As shown in FIG. 2, when image-forming unit 13 is attached to image-forming apparatus 1, supply opening 1335 is not closed by shutter 1334.

Cleaning device 135 includes toner discharge unit 1351 that extends in Y direction. At the downward surface of an end (at Y(−) side) of the toner discharge unit, a discharge opening (not shown) is provided. Cleaning device 135 discharges toners collected from photoreceptor drum 131, in the downward direction (in the direction of the dotted arrow shown in FIG. 2) via the discharge opening. The discharged toilers are discharged to a toner collection bottle (not shown), which is provided below the discharge opening, when opening and closing cover 203 is closed. At toner discharge unit 1351, a closing and opening member such as a shutter is also provided, that closes or opens the discharge opening. When opening and closing cover 203 is open, the closing and opening member closes the discharge opening, and when opening and closing cover 203 is closed, the closing and opening member opens the discharge opening. When the discharge opening is opened, toners collected by cleaning device 135 are discharged via the opening.

Figure 3:
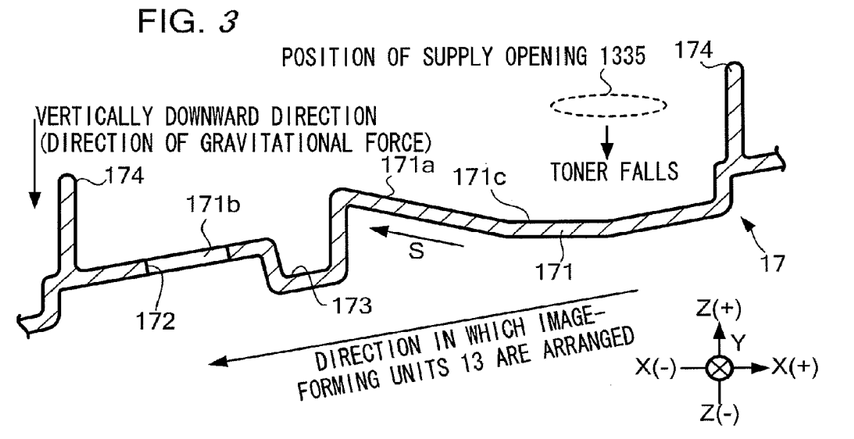
FIG. 3 is a cross-sectional view of a partition member.

FIG. 3 is a cross-section view of a part of partition member 17 along section line III-III (X-Z plane) shown in FIG. 2.

Partition member 17 is divided roughly into base part 171 and light-passing part 172. Base part 171 has a plate-like shape that extends in Y direction. Y direction is a direction in which developing device 133 is attached to or detached from image-forming apparatus 1. On the upper surface of base part 171, there are provided protrusion part 171a, part 171b located adjacent to protrusion part 171a in X direction, and part 171c located adjacent to protrusion part 171a in X direction at the other side relative to part 171b.

Protrusion part 171a is an example of a first protrusion part according to the exemplary embodiment of the present invention. Protrusion part 171a protrudes in the upper direction relative to parts 171b and 171c. Namely, protrusion part 171a is located higher than parts 171b and 171c in a case of image-forming apparatus 1. Also, protrusion part 171a is tilted in a direction of arrow S so that an end at X(−) side is located higher than an end at X(+) side. The direction is a vector having a component of a vertically upward direction. In contrast, a direction in which image-forming units 13 are arranged is a vector having a component of a vertically downward direction. Namely, the direction of arrow S has a component opposite to that of the direction in which image-forming units 13 are arranged.

Light-passing part 172 is an example of a light-passing part according to the present invention. The light-passing part allows light to pass through partition member 17. Light-passing part 172 is provided on a path of exposing light (shown in FIG. 1 by a two-dot chain line) irradiated from exposing device 12 to photoreceptor drum 131. In the present exemplary embodiment, light-passing part 172 is a slot that penetrates from the upper surface to the lower surface of base part 171. The light-passing part extends in Y direction. It is to be noted that light-passing part 172 may be, instead of a slot, a translucency member that allows light to pass through partition member 17.

Base part 171 also includes recess part 173 that is provided at the upper surface of base part 171. The recess part extends in Y direction. Recess part 173 is an example of a recess part according to the present invention. The recess part is hollow relative to part 171b. The recess part is located between light-passing part 172 and protrusion part 171a (and part 171c). The upper surface of recess part 173 is located lower than light-passing part 172.

It is to be noted that in FIG. 3, only one set of protrusion part 171a, and parts 171b and 171c are shown; however, base part 171 has plural sets of protrusion part 171a, and parts 171b and 171c (in the present exemplary embodiment, four sets), which are arranged in one direction, as shown in FIGS. 1 and 2. A single image-forming unit 13 is attached for each set of protrusion part 171a, and parts 171b and 171c, provided at partition member 17. Partition member 17 includes plural projections 174 that are provided on the upper surface of the partition member. Projections 174 function as an example of a second protrusion part, while protrusion part 171a functions as an example of a first protrusion part. Each projection 174 is located between light-passing part 172 and supply opening 1335 of developing device 133, which is attached for a set not including the light-passing part, the set being adjacent to a set including the light-passing part. The tip of projection 174 is located higher than parts 171c and light-passing parts 172 adjacent to the projection.

Now, an effect of partition member 17 having the configuration described above will be described.

Figure 4A:
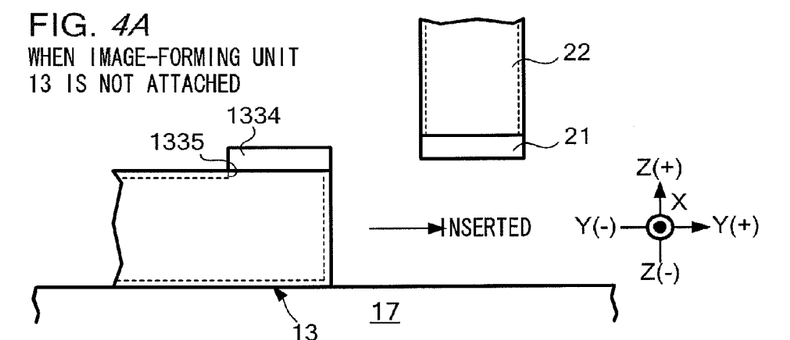
FIGS. 4A and 4B are diagrams illustrating attaching and detaching of an image-forming unit.
Figure 4B:
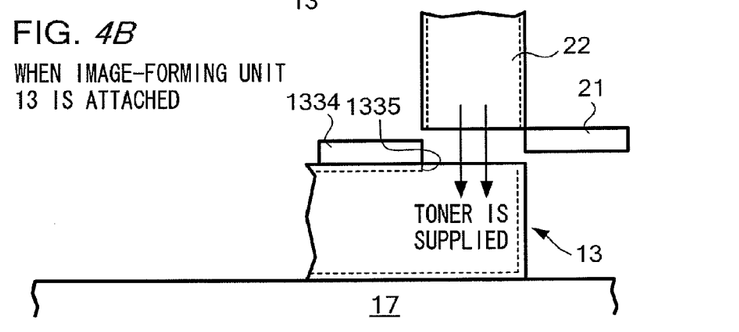
Figure 5:
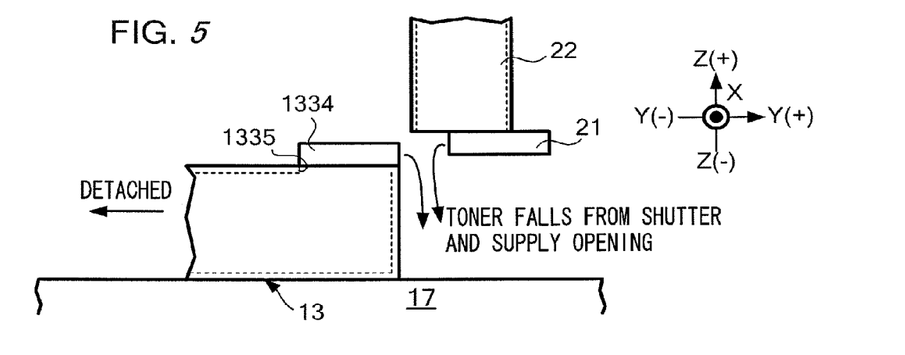
FIG. 5 is a diagram illustrating attaching and detaching of an image-forming unit.

FIGS. 4 and 5 are diagrams showing developing device 133 of image-forming unit 13 and components around the device, as viewed from X direction (from X(+) side to X(−) side). As shown in FIG. 4A, when image-forming unit 13 is not yet attached to image-forming apparatus 1, and is moved in Y direction (from Y(−) side to Y(+) side) to be attached to the apparatus, supply opening 1335 is closed by shutter 1334. At this time, toner is not supplied to developing device 133. Also, an opening of conveying pipe 22 provided in image-forming apparatus 1, which faces in the downward direction, is closed by shutter 21. The conveying pipe is a pipe through which toner supplied from a toner cartridge (not shown) is conveyed. Shutter 21 is a closing and opening member that closes or opens the opening of conveying pipe 22. On the other hand, as shown in FIG. 4B, when image-forming unit 13 is attached to image-forming apparatus 1, since shutter 1334 is engaged with a certain portion of image-forming apparatus 1, and as a result, the shutter is moved relative to supply opening 1335, supply opening 1335 is not closed by shutter 1334. After image-forming unit 13 is attached, supply opening 1335 of the unit is located below the opening of conveying pipe 22, and both the openings are opened; therefore, toner is supplied from a toner cartridge to developing device 133 via conveying pipe 22.

In a case where image-forming unit 13 is exchanged, and for this, image-forming unit 13 is detached from image-forming apparatus 1, the image-forming unit is moved from Y(+) side to Y(−) side. While the image-forming unit is moved, shutter 1334 is moved so as to close supply opening 1335, as shown in FIG. 5. Also, shutter 21 is moved so as to close the opening of conveying pipe 22. At this time, toner attached to a portion around supply opening 1335, a side (especially, Y(+) side) of shutter 1334, or an end (at Y(−) side) of shutter 21 may fall onto the upper surface of partition member 17. This is because toner may attach to these portions when toner is supplied as shown in FIG. 4B. If the toner that has fallen onto the upper surface of partition member 17 flows toward light-passing part 172, and falls into the light-passing part, the toner attaches to exposure lens 120 of exposing device 12. If the toner attaches to exposure lens 120, exposure to photoreceptor drum 131 may be prevented by the toner, and therefore, quality of an image formed by image-forming apparatus 1 may be decreased. Especially, in a partition member of a conventional art, since the member is tilted so that a side of a light-passing part is located lower, toner is likely to flow toward the light-passing part, and fall into the part. Also, falling of toner from image-forming unit 13 tends to occur because of vibration of image-forming apparatus 1 caused when the image-forming unit is attached to or detached from the image-forming apparatus (especially, when the image-forming unit is detached from the image-forming apparatus). Such falling of toner may occur across a wide area of partition member 17 that extends in Y direction.

Partition member 17 according to the present exemplary embodiment is configured so that it prevents quality of an image formed by image-forming apparatus 1 from deteriorating because of attaching or detaching of image-forming unit 13 to/from image-forming apparatus 1.

As shown in FIG. 3, when image-forming unit 13 is attached, supply opening 1335 is located at a side of partition member 17 opposite to a side at which light-passing part 172 is provided, relative to a position of protrusion part 171*a*, in a direction in which protrusion part 171*a* and light-passing part 172 are arranged. Also, protrusion part 171*a* protrudes so that its top is located higher than part 171*c*. Specifically, protrusion part 171*a* is tilted so that an end of the part at a side of light-passing part 172 is located higher. Accordingly, as compared with a case where protrusion part 171*a* is not provided, toner is not likely to flow toward light-passing part 172. In addition, the upper surface of recess part 173 is located lower than light-passing part 172. Accordingly, if toner flows over protrusion part 171*a*, the toner accumulates in recess part 173. Therefore, as compared with a case where recess part 173 is not provided, toner is prevented from flowing toward light-passing part 172. Further, since projection 174 is provided, toner is prevented from moving toward an adjacent space in which another image-forming unit 13 is attached, as compared with a case where projection 174 is not provided.

It is to be noted that in a case where light-passing part 172 is a translucency member, not a slot, attachment of toner to the light-passing part is prevented according to partition member 172. As a result, a similar effect of preventing deterioration in quality of an image is obtained.

As shown in FIG. 2, protrusion part 171*a* is provided at only a part of base part 171 that extends in Y direction. Specifically, protrusion part 171*a* is provided at a part of base part 171, that includes a part located below supply opening 1335 of image-forming unit 13 attached to image-forming apparatus 1, and is not provided at a front side of base part 171. This is because toner tends to fall from supply opening 1335 at a back side (Y(+) side) rather than at a front side (Y(−) side). If the configuration is employed, a space occupied by base part 171 in image-forming apparatus 1 is reduced, as compared with a case where protrusion part 171*a* is provided at the whole of base part 171 that extends in Y direction.

When toner is discharged from toner discharge unit 1351 of cleaning device 135, the toner is discharged from a discharge opening in the downward direction. Accordingly, the toner may fall onto partition member 17. In image-forming apparatus 1, as shown in FIG. 1, developing device 133 is located below cleaning device 135, and part 171*c* is located below developing device 133. Namely, protrusion part 171*a* and recess part 173 extend along a direction in a direction in which image-forming unit 13 is attached to or detached from image-forming apparatus 1. Accordingly, if toner falls onto partition member 17 from the discharge opening of toner discharge unit 1351, flow of the toner toward light-passing part 172 is prevented by protrusion part 171*a* and recess part 173. As a result, deterioration in quality of an image formed by image-forming apparatus 1 is prevented.

MODIFICATIONS

The present invention may be implemented as an embodiment different from the above exemplary embodiment, as described below. The following modifications may be combined with each other.

Modification 1

Partition member 17 according to the above exemplary embodiment may be modified to partition member 17A shown in FIG. 6 or partition member 17B shown in FIG. 7, as described below. It is to be noted that in the following description, parts identical to those of partition member 17 are denoted by like numerals, parts corresponding to those of partition member 17 are denoted by like numerals with a letter "A" or "B" attached, and description of these parts will be omitted.

Figure 6:
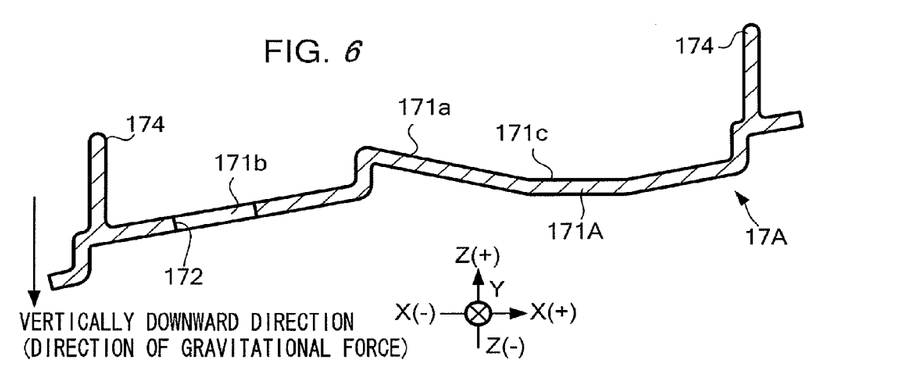
FIG. 6 is a cross-section view of a partition member.

FIG. 6 shows a cross-section of a part of partition member 17A, as viewed from the same direction in which partition member 17 is viewed in FIG. 3. Partition member 17A includes base part 171A whose configuration is similar to that of base part 171, except base part 171A lacks recess part 173. Although partition member 17A lacks recess part 173, but includes protrusion part 171*a*; accordingly, flow of toner toward light-passing part 172 is prevented.

Figure 7:
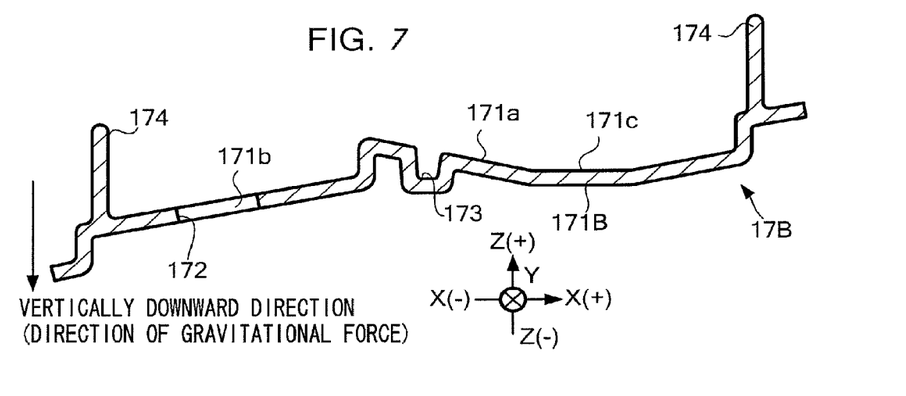
FIG. 7 is a cross-section view of a partition member.

FIG. 7 shows a cross-section of a part of partition member 17B, as viewed from the same direction in which partition member 17 is viewed in FIG. 3. Partition member 17B includes base part 171B whose configuration is similar to that of partition member 17, except recess part 173 is provided at protrusion part 171*a*, not at part 171*b*. Since partition member 17B includes protrusion part 171*a* and recess part 173, flow of toner toward light-passing part 172 is prevented.

It is to be noted that at protrusion part 171*a*, plural recess parts 173 may be provided in a direction in which protrusion part 171*a* and light-passing part 172 are arranged. Alternatively, recess part 173 may be provided at both protrusion part 171*a* and part 171*b*. Still alternatively, plural recess parts 173 may be provided at part 171*b* of partition member 17 according to the above exemplary embodiment. In essence, recess part 173 may be provided anywhere at base part 17 as long as the recess part is located at a side in which protrusion part 171*a* is provided, relative to light-passing part 172 in a direction in which protrusion part 171*a* and light-passing part 172 are arranged.

Also, it is to be noted that in the above partition members, no projection 174 may be provided. Alternatively, protrusion part 171*a* may have, instead of a slope-like shape, another shape, such as a convex shape. In essence, protrusion part 171*a* may have any shape as long as a part of the protrusion part protrudes in a direction having a component of a vertically upward direction when image-forming apparatus 1 is attached. Preferably, at least part of protrusion part 171*a* is located above part 171*c*. It is to be noted that projection 174 may have another shape, such as a convex shape.

Modification 2

In the above exemplary embodiment, where partition member 17 is used to prevent deterioration in quality of an image due to falling of toner from supply opening 1335 of image-forming unit 13, the partition member may be used to prevent deterioration in quality of an image due to falling of toner from other parts. For example, in image-forming apparatus 1, developing roll 1333 and photoreceptor drum 131 are provided so that they face each other, and the developing roll is exposed on the outside of developing device 133 at an area in which a latent image is developed (namely, a developing area); accordingly, toner may fall from the developing roll. However, even in such a situation, if any one of part 171*b*, protrusion part 171*a*, and recess part 173 is located below developing roll 1333, deterioration in quality of an image due to fallen toner is prevented as compared with a case where those parts are not provided.

Modification 3

In the above exemplary embodiment, if at least developing device 133 is included in image-forming unit 13, an effect of preventing deterioration in quality of an image is obtained. Alternatively, in the above exemplary embodiment, if at least cleaning device 135 (and/or photoreceptor drum 131) is included in image-forming unit 13, an effect of preventing deterioration in quality of an image is obtained. If developing device 133 is not included in image-forming unit 13, no protrusion part 171*a* may be provided. In this case, projection 174 functions as an example of a first protrusion part according to the present invention. In this case, recess part 173 may be provided between projection 174 and light-passing part 172.

Modification 4

In the above exemplary embodiment, where protrusion part 171*a* extends in Y direction at a part of base part 171, the protrusion part may extend in Y direction at a whole part of base part 171.

Also, the number of image-forming units 13 to be attached to or detached from image-forming apparatus 1 is not limited to four. The number may be more than or less than four.

Also, supply opening 1335 of image-forming unit 13 may be provided at, instead of a back side (Y(+) side) in a case of image-forming apparatus 1, a front side (Y(−) side). If supply opening 1335 is provided at a front side, protrusion part 171*a*, recess part 173, and projection 174 may be provided below the supply opening.

Also, it may be possible that base part 171 is not provided so that it is tilted so that one end (at X(+) side) is located above the other end (at X(−) side). Even in such a situation, deterioration in quality of an image due to fallen toner is prevented by partition member 17.

Also, partition member 17, which functions as a support member that supports image-forming unit 13 in the above exemplary embodiment, need not necessarily function as a support member. Image-forming unit 13 may be supported by other members. Even in such a situation, if partition member 17 is provided below image-forming unit 13, deterioration in quality of an image due to fallen toner is prevented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image-forming apparatus comprising:
   a first exposing unit provided below a first image carrier, that irradiates exposing light to the first image carrier;
   a partition member that separates a space in which the first exposing unit is provided from a space in which the first image carrier is provided, the partition member comprising:
      a first light-passing part that allows exposing light irradiated by the first exposing unit to pass through the partition member, and that extends in a direction in which a first developing unit is attached to or detached from the image-forming apparatus, the first developing unit being a unit that develops a latent image carried by the first image carrier, using color materials supplied through a first supply opening of the first developing unit; and
      a first protrusion part that extends along the first light-passing part, wherein the first light-passing part, the first protrusion part, and a part of the partition member located below the first supply opening of the first developing unit attached to the image-forming apparatus are arranged in an order of the first light-passing part, the first protrusion part, and the part of the partition member located below the first supply opening; and
   an image-transferring unit that transfers an image developed by the first developing unit to a medium,
   wherein:
      the partition member further comprises a recess part that extends in the direction in which the first developing unit is attached to or detached from the image-forming apparatus; and
      the first light-passing unit, the first protrusion unit, and the recess part are arranged in an order of the first light-passing unit, the first protrusion unit, and the recess part.

2. The image-forming apparatus according to claim 1, wherein a part of the first protrusion part overlaps the part located below the first supply opening.

3. An image-forming apparatus comprising:
   a first exposing unit provided below a first image carrier, that irradiates exposing light to the first image carrier;
   a partition member that separates a space in which the first exposing unit is provided from a space in which the first image carrier is provided, the partition member comprising:
      a first light-passing part that allows exposing light irradiated by the first exposing unit to pass through the partition member, and that extends in a direction in which a first developing unit is attached to or detached from the image-forming apparatus, the first developing unit being a unit that develops a latent image carried by the first image carrier, using color materials supplied through a first supply opening of the first developing unit; and
      a first protrusion part that extends along the first light-passing part, wherein the first light-passing part, the first protrusion part, and a part of the partition member located below the first supply opening of the first developing unit attached to the image-forming apparatus are arranged in an order of the first light-passing part, the first protrusion part, and the part of the partition member located below the first supply opening;

an image-transferring unit that transfers an image developed by the first developing unit to a medium; and a second exposing unit provided below a second image carrier, that irradiates exposing light to the second image carrier, wherein:

the partition member separates a space in which the second exposing unit is provided from a space in which the second image carrier is provided; and the partition member comprises:

a second light-passing part that allows exposing light irradiated by the second exposing unit to pass through the partition member, and that extends in a direction in which a second developing unit is attached to or detached from the image-forming apparatus, the second developing unit being a unit that develops a latent image carried by the second image carrier, using color materials supplied through a second supply opening of the second developing unit;

a second protrusion part that extends along the second light-passing part, wherein the second light-passing part, the second protrusion part, and a part of the partition member located below the second supply opening of the second developing unit attached to the image-forming apparatus are arranged in an order of the second light-passing part, the second protrusion part, and the part of the partition member located below the second supply opening; and a third protrusion part that is sandwiched between the first light-passing part and the second supply opening of the second developing unit in the direction in which the first protrusion part and the light-passing part are arranged, the third protrusion part extending along the direction in which the first developing unit is attached to or detached from the image-forming apparatus.

4. An image-forming apparatus comprising:

an exposing unit provided below an image carrier, that irradiates exposing light to the image carrier;

an image-transferring unit that develops a latent image carried by the image carrier, using color materials, and transfers the developed image to a medium; and a partition member that separates a space in which the exposing unit is provided from a space in which the image carrier is provided, the partition member comprising:

a light-passing part that allows exposing light irradiated by the exposing unit to pass through the partition member, and that extends in a direction in which a cleaning unit is attached to or detached from the image-forming apparatus, the cleaning unit being a unit that collects color materials that remain on the image carrier after a developed image has been transferred to a medium by the image-transferring unit; and a protrusion part that extends along the light-passing part, wherein the light-passing part, the protrusion part, and a part located below a discharge opening of the cleaning unit attached to the image-forming apparatus are arranged in an order of the part located below the discharge opening, the protrusion part, and the light-passing part, wherein:

the partition member further comprises a recess part that extends in the direction in which the cleaning unit is attached to or detached from the image-forming apparatus; and the light-passing unit, the protrusion unit, and the recess part are arranged in an order of the recess part, the protrusion unit, and the light-passing part.

5. The image-forming apparatus according to claim 4, wherein a part of the protrusion part overlaps the part located below the discharge opening.

6. An image-forming apparatus comprising:

an exposing means provided below an image carrying means, for irradiating exposing light to the image carrying means;

a partition means for separating a space in which the exposing means is provided from a space in which the image carrying means is provided, the partition means comprising:

a light-passing means for allowing exposing light irradiated by the exposing means to pass through the partition means, the light-passing means extending in a direction in which a developing means is attached to or detached from the image-forming apparatus, the developing means being a means for developing a latent image carried by the image carrying means, using color materials supplied through a supply opening of the developing means; and a protrusion means that extends along the light-passing means, wherein the light-passing means, the protrusion means, and a part of the partition means located below the supply opening of the developing means attached to the image-forming apparatus are arranged in an order of the light-passing means, the protrusion means, and the part of the partition means located below the supply opening; and an image-transferring means for transferring an image developed by the developing means to a medium, wherein:

the partition means further comprises a recess part that extends in the direction in which the developing means is attached to or detached from the image-forming apparatus; and the light-passing means, the protrusion means, and the recess part are arranged in an order of the light-passing means, the protrusion means, and the recess part.

7. An image-forming apparatus comprising:

a first exposing unit provided below a first image carrier, that irradiates exposing light to the first image carrier;

an image-transferring unit that develops a latent image carried by the first image carrier, using color materials, and transfers the developed image to a medium;

a partition member that separates a space in which the first exposing unit is provided from a space in which the first image carrier is provided, the partition member comprising:

a first light-passing part that allows exposing light irradiated by the first exposing unit to pass through the partition member, and that extends in a direction in which a cleaning unit is attached to or detached from the image-forming apparatus, the cleaning unit being a unit that collects color materials that remain on the first image carrier after a developed image has been transferred to a medium by the image-transferring unit; and a first protrusion part that extends along the first light-passing part, wherein the first light-passing part, the first protrusion part, and a part located below a discharge opening of the cleaning unit attached to the image-forming apparatus are arranged in an order of the part located below the discharge opening, the first protrusion part, and the first light-passing part; and a second exposing unit provided below a second image carrier, that irradiates exposing light to the second image carrier, wherein:

the partition member separates a space in which the second exposing unit is provided from a space in which the second image carrier is provided; and the partition member comprises:

a second light-passing part that allows exposing light irradiated by the second exposing unit to pass through the partition member, and that extends in a direction in which a developing unit is attached to or detached from the image-forming apparatus, the developing unit being a unit that develops a latent image carried by the second image carrier, using color materials supplied through a supply opening of the developing unit;

a second protrusion part that extends along the second light-passing part, wherein the second light-passing part, the second protrusion part, and a part of the partition member located below the supply opening of the developing unit attached to the image-forming apparatus are arranged in an order of the second light-passing part, the second protrusion part, and the part of the partition member located below the supply opening; and a third protrusion part that is sandwiched between the first light-passing part and the supply opening of the developing unit in the direction in which the first protrusion part and the light-passing part are arranged, the third protrusion part extending along the direction in which the cleaning unit is attached to or detached from the image-forming apparatus.

8. An image-forming apparatus comprising:

a first exposing means provided below a first image carrying means, for irradiating exposing light to the first image carrying means;

a partition means for separating a space in which the first exposing means is provided from a space in which the first image carrying means is provided, the partition means comprising:

a first light-passing means for allowing exposing light irradiated by the first exposing means to pass through the partition means, the first light-passing means extending in a direction in which a first developing means is attached to or detached from the image-forming apparatus, the first developing means being a means for developing a latent image carried by the first image carrying means, using color materials supplied through a first supply opening of the first developing means; and a first protrusion means that extends along the first light-passing means, wherein the first light-passing means, the first protrusion means, and a part of the partition means located below the first supply opening of the first developing means attached to the image-forming apparatus are arranged in an order of the first light-passing means, the first protrusion means, and the part of the partition means located below the first supply opening;

an image-transferring means for transferring an image developed by the first developing means to a medium; and a second exposing means provided below a second image carrying means, that irradiates exposing light to the second image carrying means, wherein:

the partition means separates a space in which the second exposing means is provided from a space in which the second image carrying means is provided; and the partition means comprises:

a second light-passing means that allows exposing light irradiated by the second exposing means to pass through the partition means, and that extends in a direction in which a second developing means is attached to or detached from the image-forming apparatus, the second developing means being a means that develops a latent image carried by the second image carrying means, using color materials supplied through a second supply opening of the second developing means;

a second protrusion means that extends along the second light-passing means, wherein the second light-passing means, the second protrusion means, and a part of the partition means located below the second supply opening of the second developing means attached to the image-forming apparatus are arranged in an order of the second light-passing means, the second protrusion means, and the part of the partition means located below the second supply opening; and a third protrusion means that is sandwiched between the first light-passing means and the second supply opening of the second developing means in the direction in which the first protrusion means and the light-passing means are arranged, the third protrusion means extending along the direction in which the first developing means is attached to or detached from the image-forming apparatus.

* * * * *